United States Patent
Hori

[11] Patent Number: 5,990,676
[45] Date of Patent: Nov. 23, 1999

[54] METHOD AND APPARATUS FOR DETECTION OF A MOVING SPEED OF A MOBILE TERMINAL IN MOBILE COMMUNICATION

[75] Inventor: Tsuguo Hori, Saitama, Japan

[73] Assignee: NEC Corporation, Tokyo, Japan

[21] Appl. No.: 09/012,690

[22] Filed: Jan. 26, 1998

[30] Foreign Application Priority Data

Jan. 24, 1997 [JP] Japan ..................... 9-011584

[51] Int. Cl.⁶ ................ G01P 3/36; H04B 7/26
[52] U.S. Cl. ............ 324/175; 375/325; 455/441; 702/143
[58] Field of Search ..................... 324/175, 166; 702/142, 143, 149; 329/304, 306, 310; 375/324, 325, 328, 329, 332, 341; 455/10, 67.4, 226.2, 441, 444, 506

[56] References Cited

FOREIGN PATENT DOCUMENTS

| | | |
|---|---|---|
| 4-260228 | 9/1992 | Japan . |
| 5-87825 | 4/1993 | Japan . |
| 7-226976 | 8/1995 | Japan . |

*Primary Examiner*—Jay Patidar
*Attorney, Agent, or Firm*—Sughrue, Mion, Zinn, Macpeak & Seas, PLLC

[57] ABSTRACT

In accordance with the present invention, there is provided a method and apparatus for detecting a moving speed of a mobile terminal in a mobile communication utilizing time division multiple access system, wherein a measurement is made for a variation in delay of a burst radiowave received from the mobile terminal with reference to a transmission burst signal before a calculation of a moving speed of the mobile terminal is made on the basis of the measured variation in the delay.

3 Claims, 5 Drawing Sheets

METHOD AND APPARATUS FOR DETECTION OF A MOVING SPEED OF A MOBILE TERMINAL IN MOBILE COMMUNICATION

BACKGROUND OF THE INVENTION

The present invention relates to a method and an apparatus for detection of a moving speed of a mobile terminal in mobile communication.

There has been known a method of detecting a moving speed of the movable terminal at a radio base. In this case, the detection of the moving speed is made with reference to a detected value of a received electric field. This technique is, for example, disclosed in the Japanese laid-open patent publication No. 8-33031. In detail, a radio-wave is emitted from the mobile terminal and then received in the radio base for detection of an input level of the received radio-wave. As described in Japanese laid-open patent publications Nos. 8-33031 and 3-104330, the input level of the received radio-wave is in the fading state due to strain of a transmission line. The moving speed is detected from the result of detection of the received electric field with such intense variation in the following manners.

First, center values of the received electric field levels are calculated for every time durations $\Delta t$ which are constant in order to determine short time duration center value Rm. Second, as illustrated in FIG. 1, the determined short time duration center value Rm is compared to a threshold value R in order to count the number of divisions of the threshold value R by the determined short time duration center value Rm. Third, a moving speed is calculated from the above counted number in a unit time T (T $>>\Delta t$).

As the moving speed of the mobile terminal is high, a fading pitch is increased by Doppler-effect whereby the number of division of the threshold value R by the determined short time duration center value Rm is increased. The detection of the moving speed of the mobile terminal is made by utilizing those phenomenons.

If, however, a time division multiple access system is used where the received electric field is inputted in burst state, then the accuracy of detection of the moving speed is deteriorated on the following grounds. In case of frequency division multiple access system, the radiowave received in the base is continuous wave. As illustrated in FIG. 1, the moving speed is measured by detecting the number of division of the threshold value R of the fading pitch for a unit time duration. However, the most of the recent mobile communication systems are the time division multiple access system, wherein the radiowave received in the radio base is in the burst state. In this case, the measurement is possible discontinuously but only between the bursts. This results in drop of probability of the detection of the fading pitches by which the threshold value R is divided whereby the accuracy of detection of the moving speed is deteriorated.

In the above circumstances, it had been required to develop a novel method and an apparatus for detecting a moving speed of a mobile terminal in a mobile communication utilizing time division multiple access system, which is free from the above problems.

SUMMARY OF THE INVENTION

Accordingly, it is an object of the present invention to provide a novel method for detecting a moving speed of a mobile terminal in a mobile communication utilizing time division multiple access system, which is free from the above problems.

It is a further object of the present invention to provide a novel method for detecting a moving speed of a mobile terminal in a mobile communication utilizing time division multiple access system, which is improved in an accuracy of detection.

It is a still farther object of the present invention to provide a novel method for detecting a moving speed of a mobile terminal in a mobile communication utilizing time division multiple access system, which is improved in a speed of detection.

It is yet a further object of the present invention to provide a novel apparatus for detecting a moving speed of a mobile terminal in a mobile communication utilizing time division multiple access system, which is free from the above problems.

It is a further more object of the present invention to provide a novel apparatus for detecting a moving speed of a mobile terminal in a mobile communication utilizing time division multiple access system, which is improved in an accuracy of detection.

It is still more object of the present invention to provide a novel apparatus for detecting a moving speed of a mobile terminal in a mobile communication utilizing time division multiple access system, which is improved in a speed of detection.

The above and other objects, features and advantages of the present invention will be apparent from the following descriptions.

In accordance with the present invention, there is provided a method of detecting a moving speed of a mobile terminal in a mobile communication utilizing time division multiple access system, wherein a measurement is made for a variation in delay of a burst radiowave received from the mobile terminal with reference to a transmission burst signal before a calculation of a moving speed of the mobile terminal is made on the basis of the measured variation in the delay.

BRIEF DESCRIPTION OF THE DRAWINGS

Preferred embodiments according to the present invention will be described in detail with reference to the accompanying drawings.

DISCLOSURE OF THE INVENTION

Figure 1:
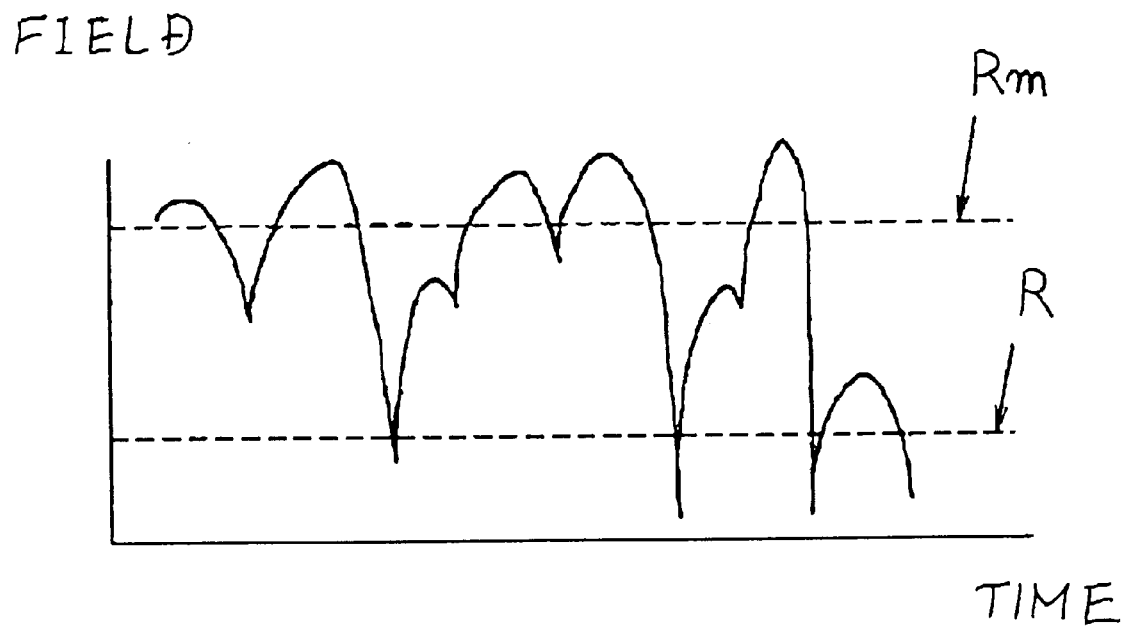
FIG. 1 is a diagram illustrative of the conventional LCR method.

In accordance with the present invention, there is provided a method of detecting a moving speed of a mobile terminal in a mobile communication utilizing time division multiple access system, wherein a measurement is made for a variation in delay of a burst radiowave received from the mobile terminal with reference to a transmission burst signal before a calculation of a moving speed of the mobile terminal is made on the basis of the measured variation in the delay.

Namely, the burst radiowave received from the mobile terminal has a transmission delay with reference to the transmission burst signal. The amount of delay depends upon a distance between the radiowave base and the mobile terminal. The amount of delay per a unit time duration of the received burst radiowave from the transmission burst signal is measured to detect the moving speed of the mobile terminal.

The present invention also provides a novel apparatus for detecting a moving speed of a mobile terminal in a mobile communication utilizing time division multiple access system. A burst timing generation circuit is provided for generating a timing signal of a transmission burst signal in accordance with signals from a control section. A transmission burst signal generation circuit is also provided which is electrically connected to the burst timing generation circuit for receipt of the generated timing signal from the burst timing generation circuit so as to generate a transmission burst signal which is synchronized with the received timing signal. A modulation/amplification circuit is also provided which is electrically connected to the transmission burst signal generation circuit for receipt of the transmission burst signal from the transmission burst signal generation circuit so as to modulate the received transmission burst signal and then amplify the modulated transmission burst signal. A first antenna is also provided which is electrically connected to the modulation/amplification circuit for receipt of the modulated and amplified transmission burst signal from the modulation/amplification circuit so as to transmit the modulated and amplified transmission burst signal. A second antenna is also provided for receipt of the modulated and amplified transmission burst signal from the first antenna. A receiving circuit is provided which is electrically connected to the second antenna for receipt of the received transmission burst signal from the second antenna in order to demodulate the received transmission burst signal. A delay detection circuit is provided which is electrically connected to the receiving circuit for receipt of the demodulated transmission burst signal from the receiving circuit so as to detect a delay of a burst signal from the demodulated transmission burst signal received. A moving speed calculation circuit is provided which is electrically connected to the delay detection circuit for receipt of the delay of the burst signal from the transmission burst signal from the delay detection circuit in order to calculate a moving speed of the mobile terminal on the basis of variation in the detected delay of the burst signal from the transmission burst signal.

As described above, the burst radiowave received from the mobile terminal has a transmission delay with reference to the transmission burst signal. The amount of delay depends upon a distance between the radiowave base and the mobile terminal. The amount of delay per a unit time duration of the received burst radiowave from the transmission burst signal is measured to detect the moving speed of the mobile terminal.

PREFERRED EMBODIMENTS
First Embodiment

Figure 2:
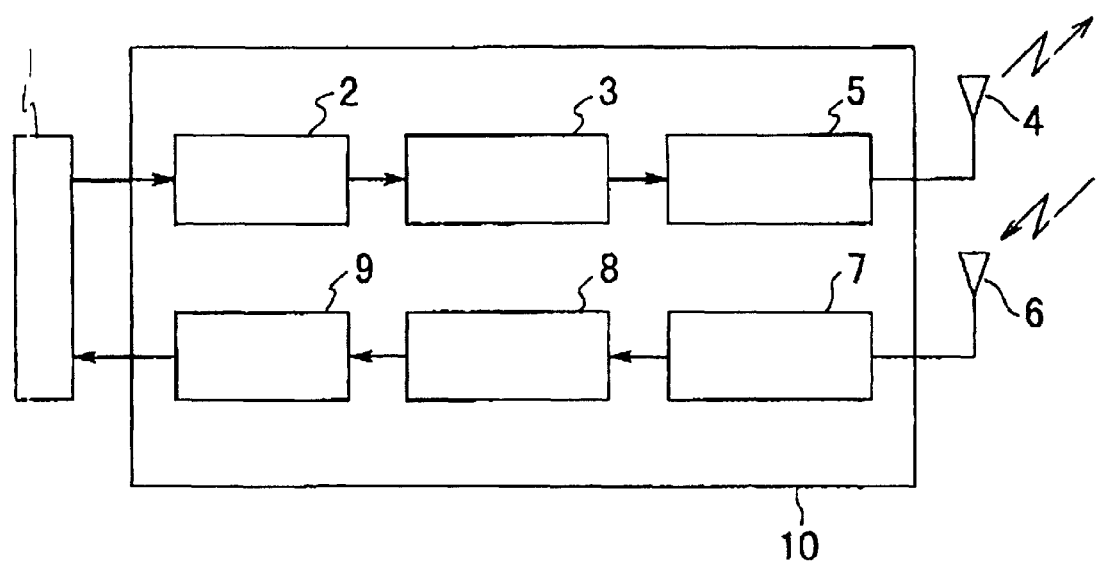
FIG. 2 is a block diagram illustrative of a novel apparatus for detecting a moving speed of a mobile terminal in a mobile communication utilizing time division multiple access system in a preferred embodiment in accordance with the present invention.

A first embodiment according to the present invention will be described in detail with reference to FIG. 2 which is a block diagram illustrative of a novel apparatus for detecting a moving speed of a mobile terminal in a mobile communication utilizing time division multiple access system. The moving speed detection apparatus 10 is provided in a radio base for mobile communications in the time division multiple access system. A moving speed detection apparatus 10 has the following structure. A burst timing generation circuit 2 is provided for generating a timing signal of a transmission burst signal in accordance with signals from a control section 1. A transmission burst signal generation circuit 3 is also provided which is electrically connected to the burst timing generation circuit 2 for receipt of the generated timing signal from the burst timing generation circuit 2 so as to generate a transmission burst signal which is synchronized with the received timing signal. A modulation/amplification circuit 5 is also provided which is electrically connected to the transmission burst signal generation circuit 3 for receipt of the transmission burst signal from the transmission burst signal generation circuit 3 so as to modulate the received transmission burst signal and then amplify the modulated transmission burst signal. A first antenna 4 is also provided which is electrically connected to the modulation/amplification circuit 5 for receipt of the modulated and amplified transmission burst signal 5 from the modulation/amplification circuit 5 so as to transmit the modulated and amplified transmission burst signal. A second antenna 6 is also provided for receipt of the modulated and amplified transmission burst signal from the first antenna 4. A receiving circuit 7 is provided which is electrically connected to the second antenna for receipt of the received transmission burst signal from the second antenna 6 in order to demodulate the received transmission burst signal. A delay detection circuit 8 is provided which is electrically connected to the receiving circuit 7 for receipt of the demodulated transmission burst signal from the receiving circuit 7 so as to detect a delay of a burst signal from the demodulated transmission burst signal received. A moving speed calculation circuit 9 is provided which is electrically connected to the delay detection circuit 8 for receipt of the delay of the burst signal from the transmission burst signal from the delay detection circuit 8 in order to calculate a moving speed of the mobile terminal on the basis of variation in the detected delay of the burst signal from the transmission burst signal.

Figure 3:
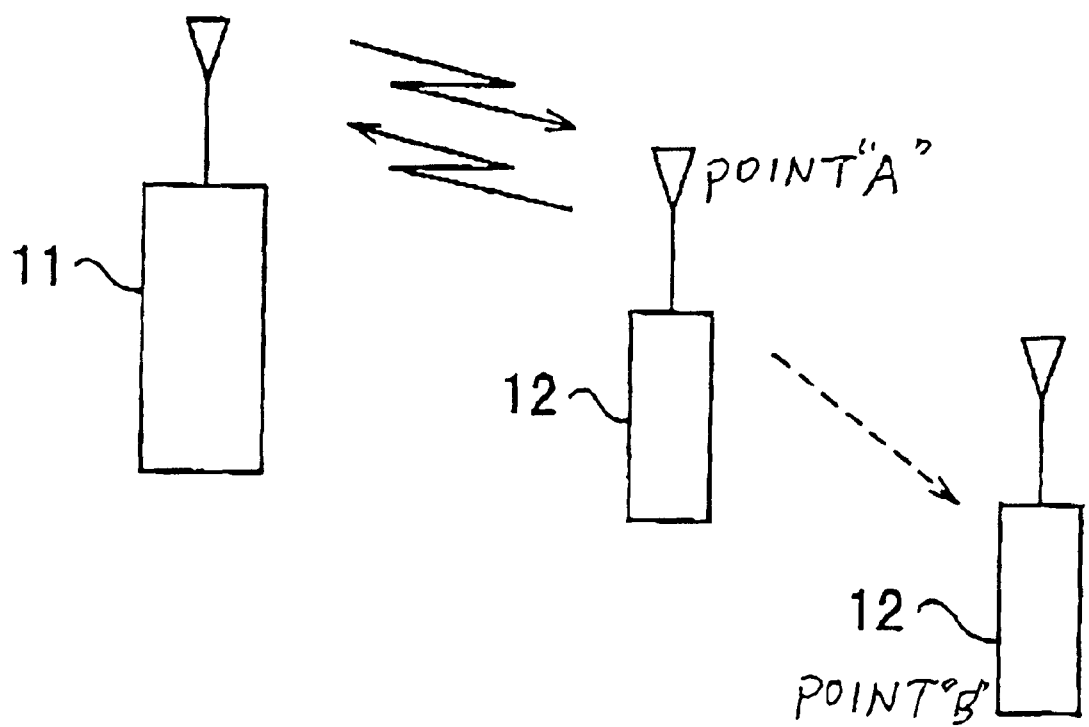
FIG. 3 is a relative position between the mobile terminal 12 and the radio base 11 to describe the present invention.
Figure 4:
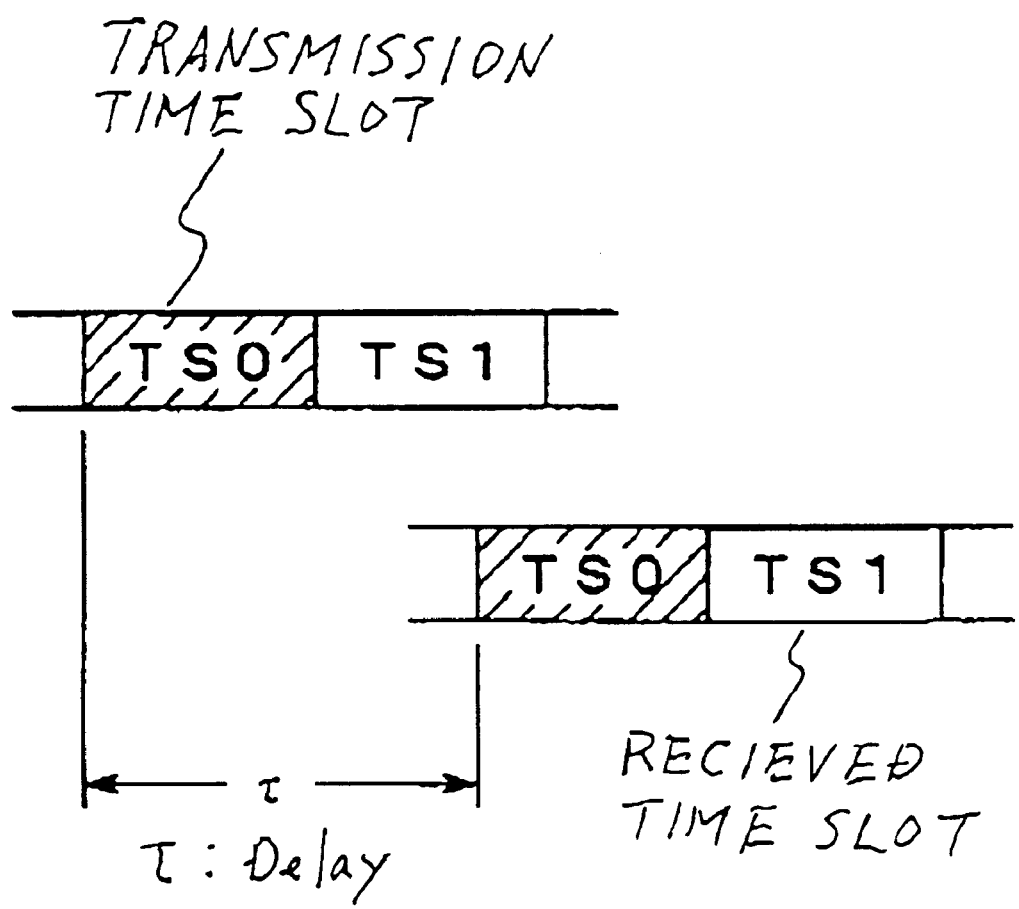
FIG. 4 is a view illustrative of a transmission time delay between the transmission time slot and the received time slot at a position "A" in a preferred embodiment in accordance with the present invention.
Figure 5:
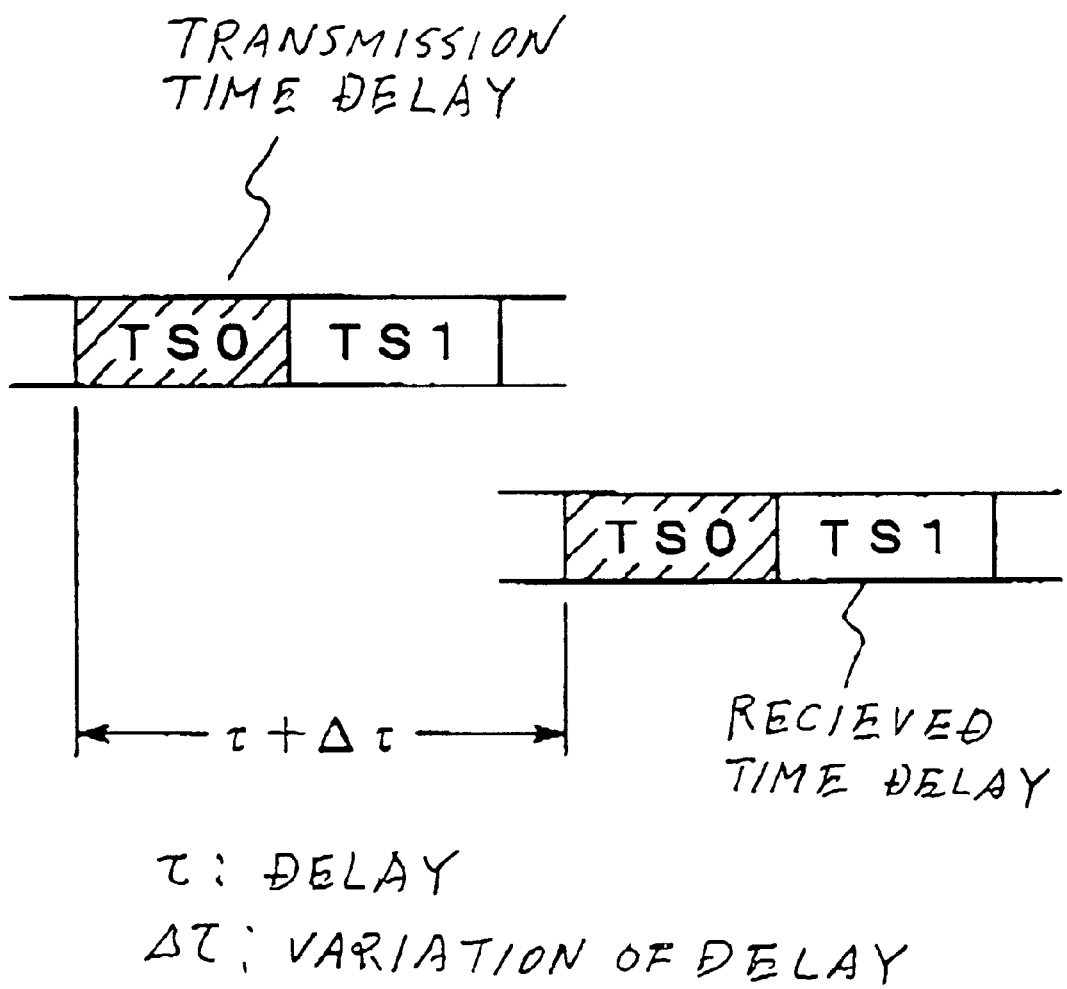
FIG. 5 is a view illustrative of a transmission time delay between the transmission time slot and the received time slot at another position "B" in a preferred embodiment in accordance with the present invention.

Operations of the above moving speed detection apparatus 10 will subsequently be described. The burst timing generation circuit 2 generates the timing signal for a transmission burst signal in accordance with the signals from the control section 1. The transmission burst signal generation circuit 3 generates the transmission burst signal as a transmission time slot which is synchronized with the received timing signal. The modulation/amplification circuit 5 modulates the received transmission burst signal as the transmission time slot as illustrated in FIG. 4 and then amplify the modulated transmission burst signal. As illustrated in FIG. 3, the transmission burst signal as the transmission time slot is transmitted from the radio base 11 to the mobile terminal 12 which is on moving from a point "A" to another point "B". The transmission burst signal as the transmission time slot is received by the mobile terminal 12. Then, a return signal as the received time slot is transmitted from the mobile terminal 12 to the radio base 11. A time duration from receipt by the mobile terminal 12 of the transmission time slot to the returning transmission of the received time slot from the mobile terminal 12 is constant and regulated, for example, in accordance with RCR-STD-27. If the time duration is longer than the regulated value, then there is any transmission delay in time. A time delay τ of the received time slot from the transmission time slot is defined as the sum of the regulated time duration and the transmission time delay.

In the prior art, this time delay τ is monitored to avoid that the variation in transmission time delay cased by the movement of the mobile terminal 12 prevents capturing of the received time slot at the radio base 11. Observation of the absolute amount of the transmission time delay is made to control wait timing for receipt tuning within a predetermined range.

By contrast to the prior art, in accordance with the present invention, there is measured a variation in transmission time delay caused by movement of the mobile terminal 12 from the point "A" to the point "B" so as to measure a moving speed of the mobile terminal 12.

Namely, the receiving time slot is received by the second antenna 6 and then demodulated by the receiving circuit 7 to fed the same to the delay detection circuit 8 so that the delay detection circuit 8 detects a time delay of the signal cased by the movement of the mobile terminal 12 and then inform the detected time delay to the moving speed calculation circuit 9. The moving speed calculation circuit 9 calculates a moving speed of the mobile terminal on the basis of variation in the detected time delay of the burst signal from the transmission burst signal and then informs the control section 1 of the calculated moving speed of the mobile terminal.

As described above, in accordance with the present invention, the moving speed of the mobile terminal is measured on the basis of the transmission time delay without use of the information about received input electric field as a parameter, so that the accuracy and speed of the detection of the moving speed of the mobile terminal are improved.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. An apparatus for detecting a moving speed of a mobile terminal in a mobile communication utilizing time division multiple access system, said apparatus comprising:

a burst timing generation circuit for generating a timing signal of a transmission burst signal in accordance with signals from a control section;

a transmission burst signal generation circuit being electrically connected to the burst timing generation circuit for receipt of the generated timing signal from the burst timing generation circuit so as to generate a transmission burst signal which is synchronized with the received timing signal;

a modulation/amplification circuit being electrically connected to the transmission burst signal generation circuit for receipt of the transmission burst signal from the transmission burst signal generation circuit so as to modulate the received transmission burst signal and then amplify the modulated transmission burst signal;

a first antenna being electrically connected to the modulation/amplification circuit for receipt of the modulated and amplified transmission burst signal from the modulation/amplification circuit so as to transmit the modulated and amplified transmission burst signal;

a second antenna for receipt of the modulated and amplified transmission burst signal from the first antenna;

a receiving circuit being electrically connected to the second antenna for receipt of the received transmission burst signal from the second antenna in order to demodulate the received transmission burst signal;

a delay detection circuit being electrically connected to the receiving circuit for receipt of the demodulated transmission burst signal from the receiving circuit so as to detect a delay of a burst signal from the demodulated transmission burst signal received and a moving speed calculation circuit being electrically connected to the delay detection circuit for receipt of the delay of the burst signal from the transmission burst signal from the delay detection circuit in order to calculate a moving speed of the mobile terminal on the basis of variation in the detected delay of the burst signal from the transmission burst signal.

2. An apparatus for detecting a moving speed of a mobile terminal in a mobile communication utilizing time division multiple access system, said apparatus comprising:

a burst timing generation means for generating a timing signal of a transmission burst signal in accordance with signals from a control section;

a transmission burst signal generation means being electrically connected to the burst timing generation means for receipt of the generated timing signal from the burst timing generation means so as to generate a transmission burst signal which is synchronized with the received timing signal;

a modulation/amplification means being electrically connected to the transmission burst signal generation means for receipt of the transmission burst signal from the transmission burst signal generation means so as to modulate the received transmission burst signal and then amplify the modulated transmission burst signal;

a first antenna being electrically connected to the modulation/amplification means for receipt of the modulated and amplified transmission burst signal from the modulation/amplification means so as to transmit the modulated and amplified transmission burst signal;

a second antenna for receipt of the modulated and amplified transmission burst signal from the first antenna;

a receiving means being electrically connected to the second antenna for receipt of the received transmission burst signal from the second antenna in order to demodulate the received transmission burst signal;

a delay detection means being electrically connected to the receiving means for receipt of the demodulated transmission burst signal from the receiving means so as to detect a delay of a burst signal from the demodulated transmission burst signal received; and a moving speed calculation means being electrically connected to the delay detection means for receipt of the delay of the burst signal from the transmission burst signal from the delay detection means in order to calculate a moving speed of the mobile terminal on the basis of variation in the detected delay of the burst signal from the transmission burst signal.

3. A method of detecting a moving speed of a mobile terminal in a mobile communication utilizing time division multiple access system, wherein a measurement is made for a variation in delay of a burst radiowave received from the mobile terminal with reference to a transmission burst signal before a calculation of a moving speed of the mobile terminal is made on the basis of the measured variation in the delay.

* * * * *